United States Patent [19]

Urano

[11] 4,239,360
[45] Dec. 16, 1980

[54] INDICATION DEVICE IN THE FINDER OF A SINGLE-LENS REFLEX CAMERA

[75] Inventor: Fumio Urano, Omiya, Japan

[73] Assignee: Asahi Kogaku Kogyo Kabushiki Kaisha, Tokyo, Japan

[21] Appl. No.: 906,527

[22] Filed: May 16, 1978

[30] Foreign Application Priority Data

May 23, 1977 [JP] Japan .......................... 52/66198[U]

[51] Int. Cl.³ ...................... G03B 17/20; G03B 15/02
[52] U.S. Cl. ..................................... 354/128; 354/53
[58] Field of Search ................ 354/289, 53, 224, 225, 354/127, 128, 155, 219, 23

[56] References Cited

U.S. PATENT DOCUMENTS

| | | | |
|---|---|---|---|
| 3,636,843 | 1/1972 | Hori et al. ............................ | 354/128 |
| 3,818,495 | 6/1974 | Sagara et al. ..................... | 354/219 X |
| 3,971,050 | 7/1976 | Okuno et al. ........................ | 354/128 |
| 4,051,503 | 9/1977 | Uno et al. ............................ | 354/289 |
| 4,074,292 | 2/1978 | Nakamoto et al. .................... | 354/53 |
| 4,087,829 | 5/1978 | Ueda et al. ........................ | 354/53 X |
| 4,090,207 | 5/1978 | Mashimo et al. .................. | 354/23 D |
| 4,096,494 | 6/1978 | Kawasaki ............................. | 354/53 |

Primary Examiner—Donald A. Griffin
Attorney, Agent, or Firm—Sughrue, Rothwell, Mion, Zinn and Macpeak

[57] ABSTRACT

A light indicating the readiness of an electric flash unit is provided in the camera view finder at the same location as the other exposure value indicators. The flash readiness indicator light is preferably an LED and is located either among or immediately adjacent an LED array for indicating the shutter speed setting.

3 Claims, 6 Drawing Figures

INDICATION DEVICE IN THE FINDER OF A SINGLE-LENS REFLEX CAMERA

BACKGROUND OF THE INVENTION

This invention relates to an indication device in the finder of a single-lens reflex camera with respect to the electric flash (stobo) ready light.

It is convenient for photographic operation for the various setting data of a camera to be displayed in the finder so that the photographer can carry out the setting operation while seeing the object through the camera. Therefore, a variety of such cameras has been proposed. However, in most of these cameras, a so-called electric flash (strobo) ready light, which is adapted to indicate whether the electric flash has been charged or not when the photographing operation is effected with a camera equipped with the electric flash, is located on the flash side of the camera and, therefore, there are a very few cameras in which the indicating light is located in the finder thereof. Even with such cameras, the position of the indicating light is remote from the other indicating elements in the finder and, therefore, confirmation must be made by turning the eye. That is, it is rather difficult for the photographer to simultaneously observe the indicating light and the other indicating elements in the finder.

SUMMARY OF THE INVENTION

Accordingly, an object of this invention is to eliminate the above-described drawbacks. More specifically, an object of the invention is to provide an indication device in the finder of a single-lens reflex camera in which the above described electric flash ready light is provided in the immediate vicinity of the other indicating elements in the finder.

DETAILED DESCRIPTION OF THE PREFERRED EMBODIMENT

Figure 1:
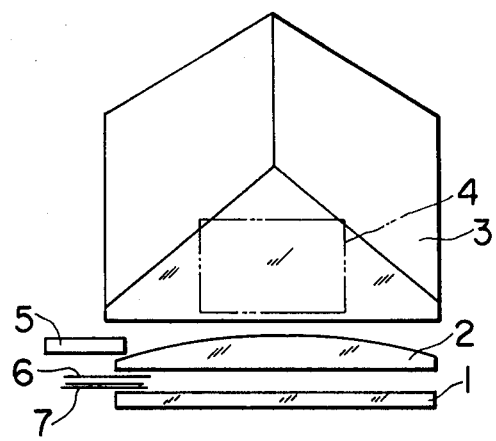
FIG. 1 is a diagram showing an optical system and an indicating system in a finder, which are viewed from behind the camera.
Figure 2:
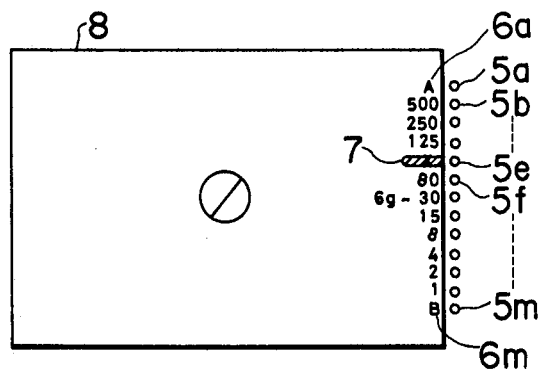
FIG. 2 is an explanatory diagram showing the arrangement of FIG. 1 as seen in the finder of the camera.

The preferred embodiment of this invention will now be described with reference to FIGS. 1–4. FIG. 1 shows a finder optical system and an indicating arrangement according to the present invention as viewed from behind a camera. Referring to FIG. 1, reference numeral 1 designates a screen, a condenser lens 2 is provided above the screen 1, and a penta prism 3 is provided above the condenser lens 2. Reference numeral 4 designates a magnifying lens (Lupe) through which the photographer looks in the finder; 5 a display element array; and 6 a dial plate on which, for instance, numerals indicating shutter speeds are printed. Reference numeral 7 designates a follow needle. In the above-described case in which numerals indicating shutter speeds are printed on the dial plate 6, the follow needle 7 is controlled by the shutter dial so that it indicates a value set on the shutter speed dial. Since the mechanism of the follow needle is well known in the art and does not constitute a part of the present invention, it is briefly shown in FIG. 1. When the arrangement thus organized is viewed through the magnifying lens 4, the finder appears as shown in FIG. 2.

As the shutter speed dial is set to a X value, the follow needle 7 points to the character X on the dial plate 6. In the case of a camera having a focal plane shutter, the X synchronization shutter speed is determined by the shutter curtain running speed. In the example shown in FIG. 2, the X synchronization is effected at an intermediate speed between "1/125" and "1/60", for instance, at "1/100". Characters and numerals A through B, indicated by reference numerals 6a–6m, respectively and similar to those on the shutter dial, are printed on the dial plate 6. A and B are intended to mean automatic exposure (of a stop priority type in this example) and bulb, respectively. The display array 5 is made up of light emission diodes (LED's). Out of these LED's, the LED 5e is employed as an electric flash (strobo) ready light, and the remaining LED's 5a through 5d and 5f through 5m are employed as exposure display elements. All of the LED's are arranged outside of the picture frame 8.

Figure 3:
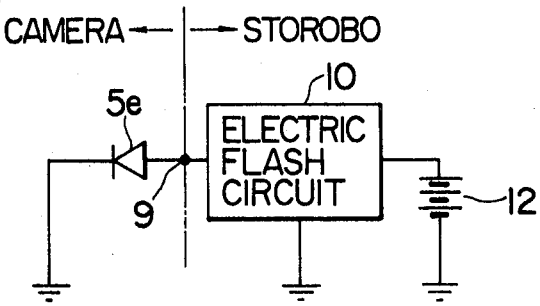
FIG. 3 is a connection diagram of an electric flash ready light.
Figure 4:
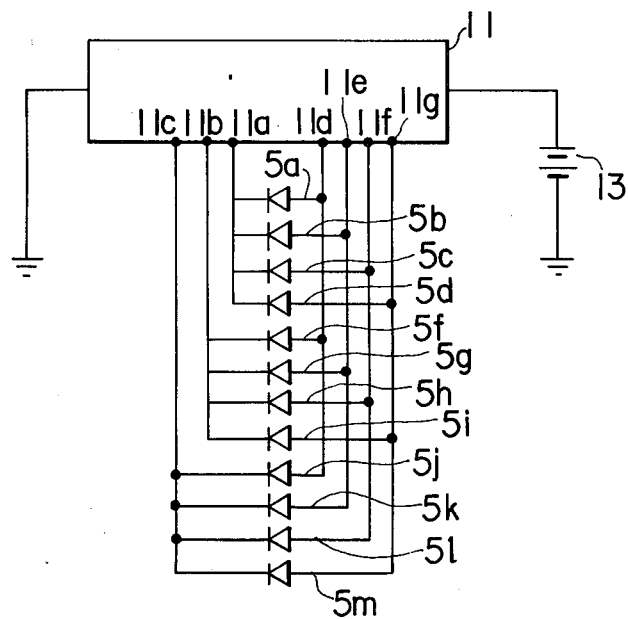
FIG. 4 is a connection diagram of exposure indicating elements.

The electrical circuit diagrams of the LED 5e and the remaining LED's are as shown in FIGS. 3 and 4, respectively. Referring to FIG. 3, the cathode terminal of the LED 5e is grounded, while the anode terminal thereof is connected through a connector 9 to a circuit 10 in the electric flash. The electric flash circuit 10 is of a type well known in the art and need not be described in detail herein. The circuit 10 is connected to an electric source 12 in the electric flash. When charging of a capacitor (not shown) in the circuit 10 is completed so as to be ready for the flashing operation of the electric flash, the LED 5e is forwardly biased through the connector 9, as a result of which the LED 5e emits light.

Referring to FIG. 4, the LED's 4a through 5d and 5f through 5m are connected to a display circuit 11 as described below. The cathodes of the LED's 5a through 5d, the LED's 5f through 5i, and the LED's 5j through 5m are connected to terminals 11a, 11b and 11c of the circuit 11, respectively, while the anodes of the LED's 5a, 5f and 5j, the LED's 5b, 5g and 5k, the LED's 5c, 5h and 5l, and the LED's 5d, 5j and 5m are connected to terminals 11d, 11e, 11f, and 11g of the circuit 11, respectively. Upon energization of the circuit 11 by an electric source 13, one of the twelve LED's indicating a shutter speed determined by the three exposure elements, that is, an objects's brightness value, a lens stop value and a film sensitivity value, is forwardly biased. If forward biasing occurs between the terminals 11b and 11e for instance, the LED 5g is caused to emit light thereby indicating a shutter speed 1/30 in FIG. 2. In the case where the shutter speed dial is set to value A, exposure is effected at the shutter speed 1/30 by automatically operating the shutter; and for manual shutter dial the correct exposure is obtained by setting the shutter speed to a value of 1/30 indicated by reference numeral 6g.

Figure 5:
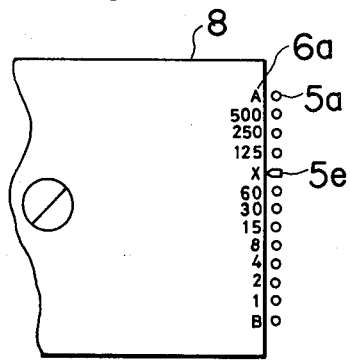
FIG. 5 is a view similar to FIG. 2 showing the inside of the finder in which the configuration of the electric flash ready light is different from those of the exposure indicating elements.

The LED 5e for the electric flash ready indication may be positioned so as to indicate an X synchronization shutter speed (X in FIG. 2) instead of or in combination with the follow needle 7. Since the position of the LED 5e is very close to the exposure indicating LED's, confirmation of various data can be effected without turning the eye, and observation of the data can be made with ease. Furthermore, the light emission by LED 5e should indicate the position of the follow needle 7 and, therefore, the erroneous operation of the shutter speed dial can be readily detected. When the electic flash is charged, the LED 5e and one of the remaining twelve LED's are caused to emit light; however, the former can be readily distinguished from the latter if the LED 5e is made to be different in light color from the remaining LED's. For instance, light emission diodes adapted to emit red light may be employed for the LED's 5a, 5e and 5m which indicate A, X and B, respectively, while light emission diodes adapted to emit green light may be employed for the remaining LED's as light emission diodes emitting red, yellow and green light are available. The same effect can be obtained by making the shape of the LED 5e different from those of the remaining LED's as shown in FIG. 5. The LED or LCD could be readily formed into various shapes.

Figure 6:
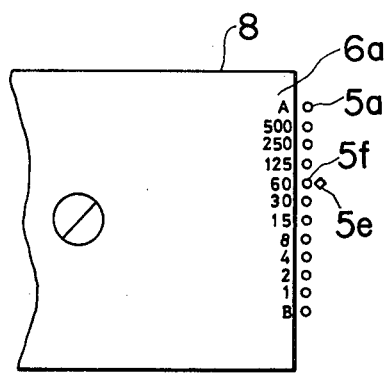
FIG. 6 is a view similar to FIG. 2 showing the inside of the finder in which the electric flash ready light and one of the exposure indicating elements are aligned in a horizontal direction.

FIG. 6 shows a case where the X synchronization speed is 1/60 so that the exposure indicating LED and the electric flash ready light indicate the same shutter speed. In such a case, the two LED's may be arranged horizontally as shown in FIG. 6. Furthermore, since the manual shutter speed indication and X synchronization speed indication are not used simultaneously, the same LED could be utilized for the two purposes, and the circuit connection would be a simple matter to one of ordinary skill in the art.

As is apparent from the above description, according to the present invention the electric flash ready light is arranged in the region of the exposure indicating elements so as to serve as a signal indicating the charging completion of the electric flash. Thus, an indication device in which the various indicated data can be observed with ease and the erroneous setting operations can be readily detected can be provided according to the present invention without substantial increase in the manufacturing costs.

What is claimed is:

1. In an indication device in the finder of a single-lens reflex camera in which characters representing exposure values are arranged in said finder and exposure value indicating elements are arranged so as to indicate said characters, respectively, wherein the improvement is characterized in that an electric flash indicating element for indicating the readiness of an electric flash is located among said exposure value indicating elements so that a user of the camera need not shift his eye from the exposure value indicating elements in order to see said electric flash indicating element, wherein said characters indicate shutter speed values, and wherein said electric flash indicating element also indicates the X synchronization shutter speed.

2. An indication device as claimed in claim 1, characterized in that said electric flash indicating element comprises a light emission diode whose emitted light is different in color from that of the remaining exposure value indicating elements.

3. An indication device as claimed in claim 1, characterized in that said indicating element employed as said electric flash ready light is different in configuration from the remaining indicating elements.

* * * * *